United States Patent [19]
Sayler et al.

[11] Patent Number: 5,923,317
[45] Date of Patent: Jul. 13, 1999

[54] TWO-HANDED CONTROLLER FOR VIDEO GAMES AND SIMULATIONS

[75] Inventors: David J. Sayler; Eric Y. Park; I-Chiang Sun; Henry Y. Chin; Sohrab Vossoughi; Lutz Kucher, all of Portland, Oreg.

[73] Assignee: Thrustmaster, Inc., Hillsboro, Oreg.

[21] Appl. No.: 08/877,064

[22] Filed: Jun. 17, 1997

[51] Int. Cl.⁶ ........................................ G09G 5/00
[52] U.S. Cl. ............................................. 345/156
[58] Field of Search .................................. 345/156, 157, 345/158, 161, 163, 167; 364/706, 709; 463/36, 37, 38, 39

[56] References Cited

U.S. PATENT DOCUMENTS

| | | |
|---|---|---|
| 5,012,230 | 4/1991 | Yasuda . |
| 5,059,958 | 10/1991 | Jacobs et al. . |
| 5,389,950 | 2/1995 | Bouton . |
| 5,394,168 | 2/1995 | Smith, III et al. ...................... 345/156 |
| 5,396,267 | 3/1995 | Bouton . |
| 5,431,064 | 7/1995 | Franz . |
| 5,501,458 | 3/1996 | Mallory ................................ 273/148 B |
| 5,504,502 | 4/1996 | Arita et al. . |
| 5,793,356 | 7/1995 | Svancarek et al. ....................... 345/161 |

OTHER PUBLICATIONS

SEGASATURN HSS–0137 product information, Sega Enterprises, Ltd., Japan, 1996.
THRUSTMASTER® PHAZER PAD™ PC game pad product literature, Thrustmaster, Inc., Hillsboro, Oregon, Sep. 1996.

*Primary Examiner*—Mark K. Zimmerman
*Assistant Examiner*—Ronald Laneau
*Attorney, Agent, or Firm*—Marger Johnson & McCollom P.C.

[57] ABSTRACT

A two-handed game controller has a single dual analog/digital x-y directional pad mounted on the top which can perform either analog or digital functions. A mode switch on the controller allows an operator to select either analog or digital control settings. The controller also has a button grouping located within a concave recess. Each button within the recess has a downward slanting top maintained at an elevation a specified distance from the controller, thereby allowing for easy actuation by a gliding, rolling or sliding motion of a user's thumb or finger. The controller also has semicircular sides and 3-dimensionally tapered hand-grips, facilitating grip from virtually any size hand, from child to adult. Digital triggers are mounted on both the top and bottom of the controller and are configured to perform the same functions, allowing table-top use. Furthermore, the controller has a tripod-like structure with slip-resistant grips providing stability on a table-top surface.

22 Claims, 5 Drawing Sheets

TWO-HANDED CONTROLLER FOR VIDEO GAMES AND SIMULATIONS

BACKGROUND OF THE INVENTION

This invention relates generally to controllers for games and simulator programs implemented on a personal computer ("PC") or a dedicated video game system and more particularly to two-handed game controllers for inputting user commands to game and simulation programs via a PC port or bus, or a video game system input terminal.

Conventionally, either a PC running a game or simulation program or a specialized video game system receives input from an external control device, such as a user-operated game controller. PC's generally come equipped with a game or other port where an external controller can be plugged in. Video game systems generally come with at least two ports for controller input. Controllers provide an essential key to the functioning and enjoyment of a video game or simulation by providing the necessary link between a user's actions and the signal input into the PC or game system. A controller senses the user's actions and converts them into electronic signals which are transmitted to the PC or game system and used control the video game or simulation. The game or simulation can thereby react to the user's actions. In order to satisfy consumer desires and expectations, therefore, a controller must accurately interpret and transfer the input from the operator to the machine, and additionally should provide for comfortable use and full functionality.

Various controllers and simulation devices have been developed which attempt to satisfy an operator's desires for realistic control, comfortable use, quick response, accurate input transfer and ease of button/function access. These devices include: single-handed controllers, analog controllers, digital controllers, two-handed controllers, joystick controllers, throttle devices, steering wheel inputs, gun-shaped controllers, foot controllers, and much more; each of them striving to meet consumer hopes for a more enjoyable gaming experience. Even with all these devices, however, there still remain several industry-wide problems.

One problem that the industry has faced in meeting consumer desires is providing a controller that allows variable analog input to the video game while still providing the capability of digital (discrete value) input. Traditionally, controllers have been either digital or analog, or have otherwise been built with separate actuators for digital and analog control. Efforts to provide a single controller with both analog and digital capabilities have been largely unsuccessful in meeting consumer desires because they have resulted in the creation of bulky, unmanageable controllers and/or inconvenient access to either analog or digital functions. For example, the Sega digital/analog controller uses separate actuators for digital and analog functions, requiring a bulky body and resulting in actuators inconveniently located within the body.

Purely analog controllers are also undesirable for many operators because of the loss of traditional digital functionality and feel, often desirable and sometimes required for game play. The Fujitsu x-y pointing device, U.S. Pat. No. 5,504,502, is an example of an analog device, used in a PC keyboard, for x-y directional pointing of a computer cursor. A need, therefore, remains for a compact controller capable of both analog and digital signal transfer, with convenient access to both the analog and the digital actuator.

An additional problem in the industry is the configuration of the button groupings on existing controllers, especially two-handed controllers. In button groupings of conventional two-handed controllers, the buttons, while generally in close proximity, fail to offer optimal rapid, easy, and comfortable access from one button to another. The button configurations of the prior art typically have divergent pairs, as in the Sega controller, or parallel button lines, as in many generic controllers. Furthermore, the button's tops tend to protrude from the controller's top surface with a shape and configuration such that a user's hand digit will "catch" on the button edge of an adjacent button if the thumb or finger is slid from one button to another. These configurations of the prior art fail to provide for the most desirable, efficient and ergonomic access by a user's hand digit, as they each require the lifting of the hand digit to reach other buttons within the grouping. It is therefore desirable, to have a button grouping configuration and design that would allow a user to slide, glide or roll his thumb or finger easily from one button in the grouping to another without having to lift it from the controller, and without it "catching" on another button.

A further concern in the industry is the problem of creating a controller that is comfortable for virtually every possible user, regardless of hand-size. Controllers in the industry are currently incapable of being adjusted to fit various hand-sizes. As a result, the controllers are either too small for a large-handed operator or too bulky for a small-handed operator. This means that conventional controllers are uncomfortable for many of the market consumers. Particularly, most two-handed controllers only fit loosely in the hands of large-handed users, requiring uncomfortable curling of the hand digits in order to actuate the controller functions. On the other hand, small-handed users must move their hands around the controller during operation to access all of the various functions. A controller design is needed, therefore, that will facilitate comfortable access to all of the features and functions by users of various hand-sizes.

Furthermore, conventional controllers lack a comfortable, ergonomic gripping structure configured for various hand-sizes, which is desirable for both normal and extended game-play. In order to be comfortable and ergonomic, the gripping structure should "fill" the user's hands, regardless of size. The need exists, therefore, for a "one-size-fits-all" controller that provides a comfortable and ergonomic gripping structure for use by operators with various hand-sizes.

There exists in the industry, additionally, a need for a two-handed controller that allows full controller functionality from a hand-held position or while positioned on a table-top or other surface. There are several conventional two-handed controllers which offer triggers located on the bottom or the front of the controller to enhance game play by enabling a trigger function. However, if these controllers were to be set down on a table-top, the triggers would become inaccessible or at least inconvenient, and game play would be correspondingly impeded by the loss or impairment of the trigger functionality. Furthermore, conventional two-handed controllers are designed for hand-held operation and therefore lack structures for effective table-top operation. Many consumers desire the capability of using the video game controllers from either a hand-held or table-top position. It is desirable, therefore, to have a controller design that provides full functionality of enhanced and normal features from either position.

SUMMARY OF THE INVENTION

It is, therefore, an object of the invention to enable an x-y directional controller or actuator to offer both analog and digital functionality from a single efficient device.

An additional object of the invention is to enable the operator to access all of the buttons in the button grouping without requiring removal of the actuating hand digit from the controller surface.

Another object of the invention is to supply a two-handed controller that will comfortably fit nearly any size hand and additionally include a complete and comfortable gripping structure, ergonomically designed for normal and extended play.

Yet another object of the invention is to allow full access to all feature functionality, including the trigger function, with the controller operated while positioned on a table-top (or other horizontal surface) as well as in a hand-held position.

The invention offers a significant advancement in the art of game and simulator controllers by supplying a single x-y directional actuator that functions in either analog or digital mode, as desired. Preferably, though not required, not only does the invention provide both capabilities, it also provides the traditional tactile feedback associated with each mode. While this feature is extremely advantageous in two handed controllers, it is also usable in other computer input devices, such as keyboards, joysticks, or computer mouses.

Additionally, the invention provides a button grouping configuration within a concave recess, with sloping top surfaces, to allow comfortable and quick access to each of the buttons in the grouping with a simple glide or roll of the finger or thumb from the other buttons. Preferably, the buttons are also arranged in pairs along radii which converge toward the user's thumb pivot joint.

The invention further provides a two-handed controller with a housing having a unique semicircular gripping shape configured in such a way that it will fit various sized hands comfortably, from child to adult, and still provide full and comfortable access to each of the actuators. Preferably, the controller's primary actuators are positioned within either side of the housing such that their locations correspond to an operator's "pinch point" (the point where the thumb tip and index finger tip are comfortably touched together), when the hands are located at the appropriate spot along the semicircular housing periphery.

The two-handed controller housing of the present invention further provides three-dimensional, substantially wedge shaped gripping structures that appropriately fill an operator's hands over a wide range of hand-sizes, including typical child and adult sizes. The combination of a semicircular shape and tapered gripping structures with the preferable actuator locations, provides a comfortable and ergonomic controller with full access to controller functions for user's of a variety of hand-sizes.

Furthermore, the invention allows full functionality from either a hand-held or table-top resting position by providing interconnected trigger features on the top side as well as the bottom side, and by providing a tripod-like, tip and slip-resistant structure on the bottom of the controller for stable table-top game play.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT OF THE INVENTION

Frame of Reference

Figure 1:
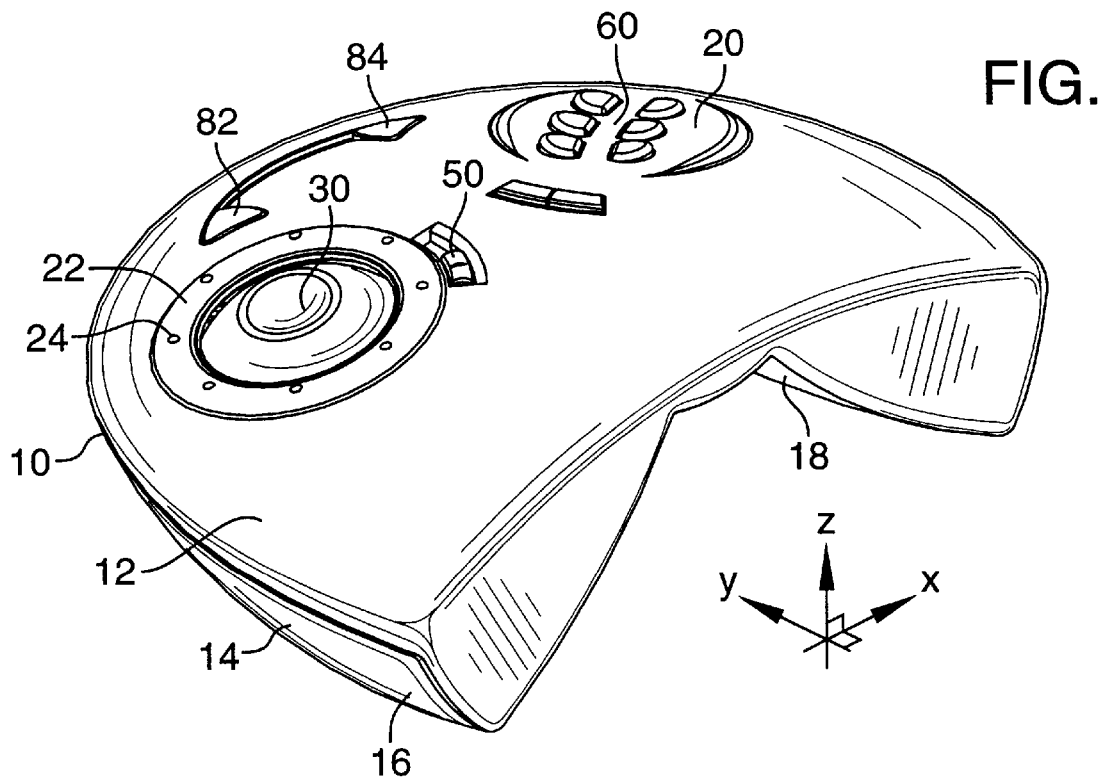
FIG. 1 is a top, rear, left perspective view of one embodiment of a two-handed game controller according to the invention.

Shown in FIG. 1 is a frame of reference which relates to the usual orientation of the controller, from a user's viewpoint. In the description, it is also used to describe the relative orientation of parts within the invention. This frame of reference will be used throughout the description and claims. According to the reference frame, therefore, which uses an x, y, and z axis; up is in the direction of the positive z axis, down is in the direction of the negative z axis, right is in the direction of the positive x axis, left is in the direction of the negative x axis, front is in the direction of the positive y axis, and back is the direction of the negative y axis.

Overall Arrangement

Figure 2:
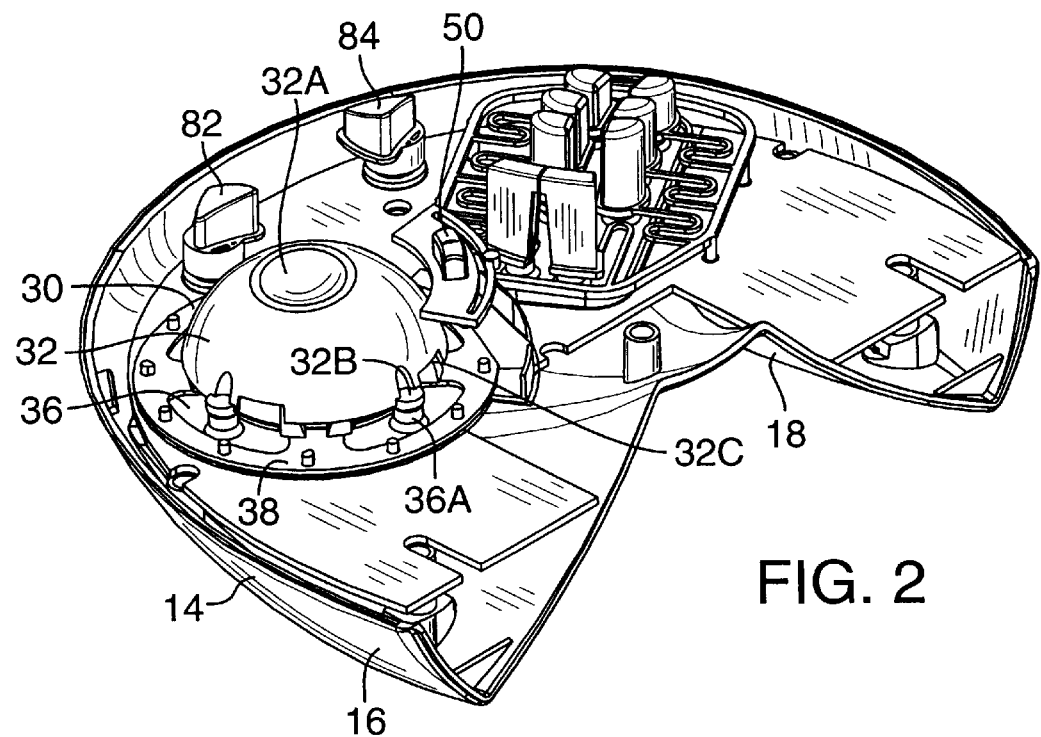
FIG. 2 is a perspective view of the controller similar to FIG. 1, with the upper housing removed to show internal components and structures.

Referring to FIGS. 1 and 2, a preferred embodiment of the present invention comprises a housing 10 including top and bottom molded structures 12, 14 assembled together along their peripheries to form a housing enclosure. The left and right sides of the housing bottom 14 are formed into mirror-symmetric left and right gripping members 16 and 18, respectively. The top of the housing 12 is further molded in a shallow dome or convex shape, with a shallow concave recess 20 on the right side toward the front of the housing, and an annular directional guide 22, on the left side toward the front of the housing. An x-y directional actuator 30 having a dome-shaped actuating member 32 (see FIG. 2) is located within the directional guide 22. The directional guide 22 has notches or markings 24 geometrically spaced along its periphery to aid the user in directing the x-y directional actuating member 32 in the desired direction. An analog/digital mode switch 50 is located on the periphery of the directional guide 22. Within the concave recess 20 is a button grouping 60. Left and right trigger buttons 82 and 84, respectively, are located on the front of the housing top structure 12. Left and right triggers 86 and 88, respectively, are located on the front of the bottom structure 14 (see FIG. 6).

Figure 5:
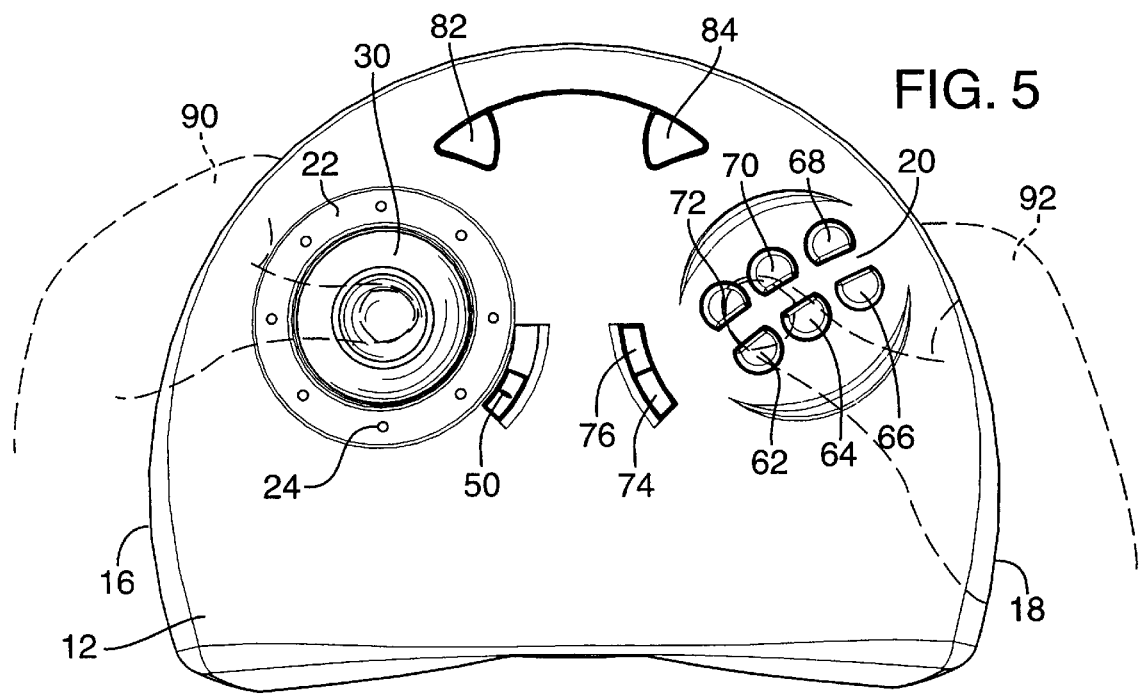
FIG. 5 is a top plan view of the controller in FIG. 1, with outlines of representative large and small hands positioned on opposite sides thereof, showing how the semicircular controller shape facilitates comfortable access to controller functions from nearly any size hand.
Figure 6:
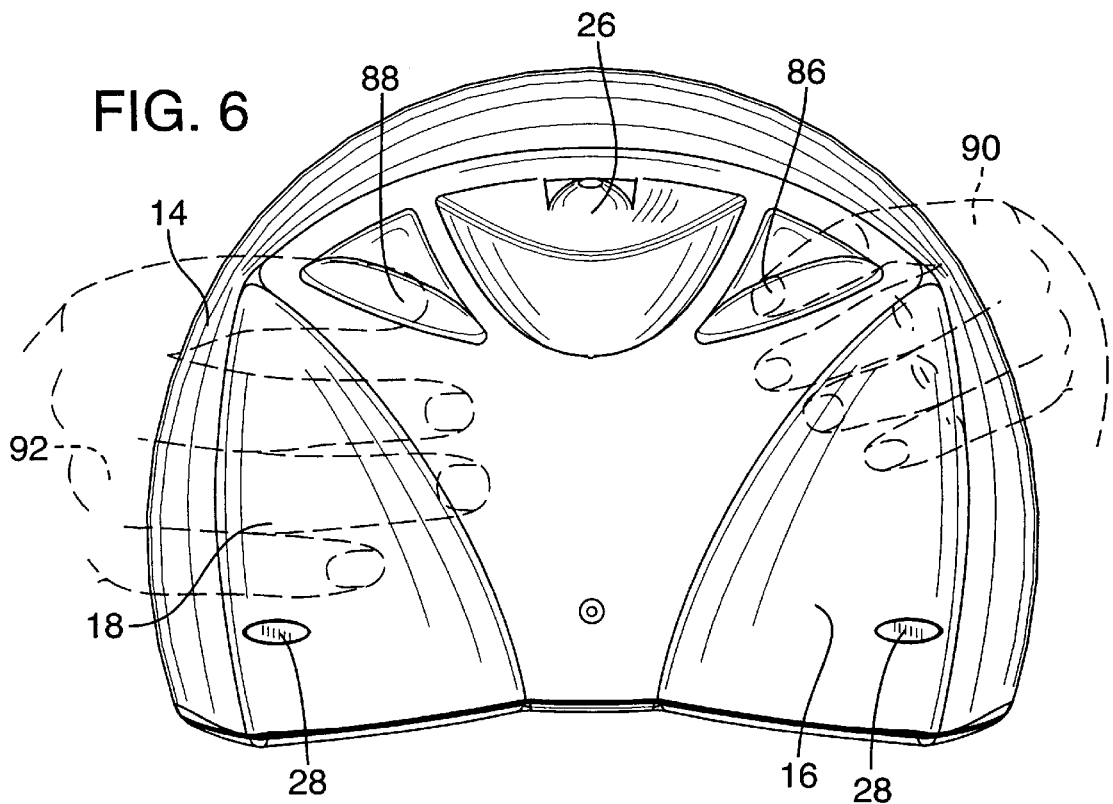
FIG. 6 is a bottom plan view of the controller in FIG. 1, with outlines of representative large and small hands positioned on opposite sides thereof, showing the ability of various hand-sizes to use the controller comfortably and ergonomically, by grasping the gripping members on the underside of the controller housing.

As shown in FIGS. 5, 6, the periphery of housing 10 is formed in a semicircular shape along its front and sides to permit placement of the operator's hands at an appropriate spot, based on hand-size, anywhere along this surface. The x-y directional actuator 30 and the button grouping 60 are centered along a chord through the semicircularshaped housing, such that they are readily accessible from a user's thumb or other hand digit when the hand is appropriately positioned along the periphery of the housing 10.

Additionally, left and right gripping members 16, 18 are shaped in the form of 3-dimensional tapered wedges which are widest and thickest at the back and taper upwardly and outwardly (towards their respective sides of the housing 10) thereby narrowing relative to both the x and z axis toward the front of the housing.

Dual Analog/Digital X-Y Directional Actuator

Figure 3:
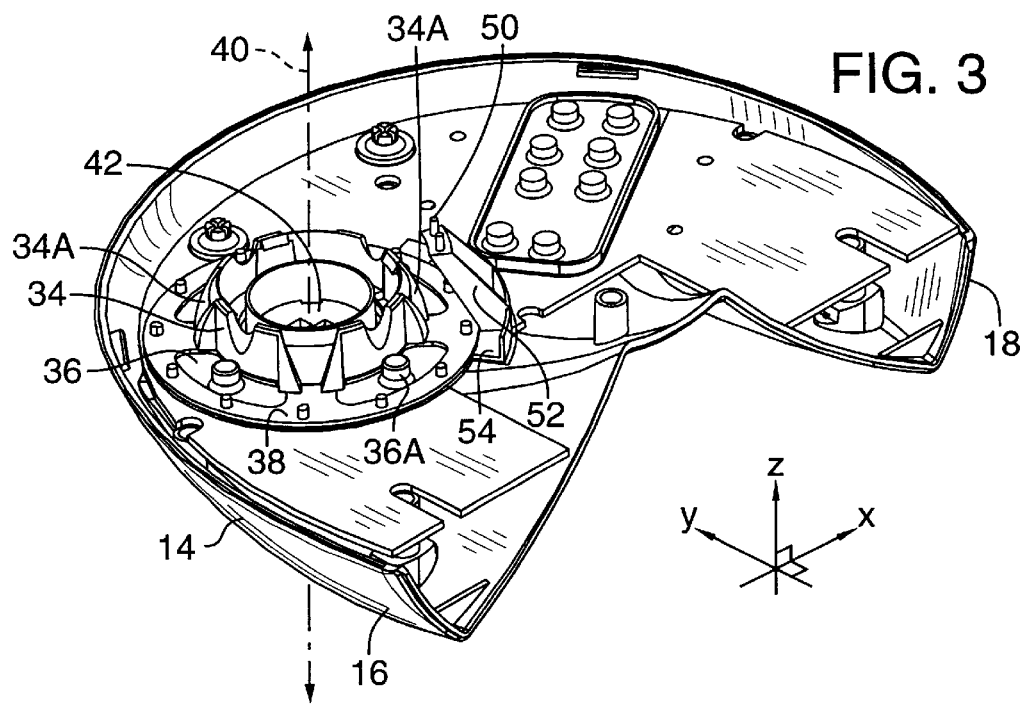
FIG. 3 is a further perspective view similar to FIG. 2 with upper internal components removed to show additional controller components.

Referring to FIGS. 2 and 3, the x-y directional actuator 30 comprises a dome-shaped actuating member 32, an actuator frame 34, a digital contact pad 36, a contact pad frame 38, and an analog sensor 42. The actuating member 32 of the actuator 30 is located near the front left side of the housing top 12 in a position easily accessible to a thumb digit from a user when the user's hand is located appropriately along the left gripping member 16.

Referring to FIG. 2, the actuating member 32 comprises a concave digit recess 32A in the top, center portion (for placement of an operator's thumb or other hand digit), four contacting members 32B, and four disengagement slots 32C. The actuating member 32 is supported on a small (approximately 1 mm diameter) pivot point (not shown) located in the center and near the bottom of the actuator frame 34 (see FIG. 3).

Referring to FIG. 3, the actuator frame 34 has alignment members 34A, which align the actuating member 32 about a central actuator axis 40; the central actuator axis 40 being parallel to the z axis and passing through the center of the actuator frame 34. The alignment member 34A surfaces are smooth and thus allow free pivotal movement of the actuating member 32 in the x and y directions. However, the structural relationship between the alignment members 34A and the actuating member 32 prevents relative rotation of the actuating member 32 about the central axis 40 by more than about 5 degrees. The actuating member 32 has four thin internal ribs (not shown) that fit loosely within four alignment members 34A. Each alignment member 34A comprises two oppositely-inclined surfaces which contain the internal ribs of the actuating member 32 and thereby prevent substantial rotation of the actuating member 32 relative to the actuator frame 34 about central axis 40.

Referring to FIGS. 2 and 3, the digital contact pad 36 is held in place and prevented from rotating by the contact pad frame 38. The contact pad frame 38 is connected to the mode switch 50 which engages a detent feature (not shown) on the inside of the housing top 12, thereby preventing accidental rotation. The digital contact pad 36 is made of a flexible material and comprises four contact posts 36A having carbon inserts to actuate a signal when depressed. In the preferred embodiment, when the contact posts 36A of the digital contact pad 36 are depressed, the carbon insert closes a circuit, and a signal is relayed to the video game corresponding to the depressed post. The video game then interprets this signal as a particular x-y direction. When two posts are depressed, the video game accepts both signals and the resulting direction is a combination of those two signals. In operation, when the mode switch 50 is in digital mode, the contacting members 32B of the actuating member 32 are in proximity with the contact posts 36A of the digital contact pad 36. By moving the actuating member 32, any one or any two nearby contact posts 36A can be simultaneously depressed and the resulting signal will be sent to the game or simulation.

In another potential embodiment, however, the contact posts 36A may provide digital-like resistance (to provide a "digital-feel" tactile feedback) but perform no signal actuating function (i.e. when the digital function is performed by electronically interpreting the analog signal within predetermined ranges as a corresponding digital signal).

This invention uniquely allows utilization of the same x-y directional actuating member to communicate an analog signal to the video game. In the preferred embodiment, the analog/digital mode switch 50 has a mode switch post 52 connected to a mode switch base 54. The mode switch base 54 is connected to the contact pad frame 38. When the mode switch 50 is moved from digital into analog position, the contact pad frame 38 and, correspondingly, the digital contact pad 36 are rotated in relation to the actuating member 32 and the disengagement slots 32C thereby become located over the contact posts 36A. The analog sensor 42 is activated or selected simultaneously and analog signals are thereafter relayed to the video game or simulation in response to movement of the actuating member 32. In another potential embodiment, the actuating member 32 can be connected to the mode switch base 54 and rotated in relation to the digital contact pad 36 to achieve the same result.

Preferably, though not required, not only does the invention provide both analog and digital capabilities, but also the traditional tactile feedback associated with each mode. In the preferred embodiment, the actuator is allowed a large range of motion (preferably between 10–15 degrees angular movement from the z axis in each direction), while in analog mode, thus giving the proper "analog-feel" associated with variable-input analog control. This freedom of movement is achieved by the positioning of the disengagement slots 32C over the contact posts 36A. In digital mode, however, the range of motion is substantially restricted (preferably to between approximately 3–5 degrees angular movement from the z-axis, and most preferably about 3 degrees) by the communication between contacts 32B and 36A which provide traditional discrete "digital-feel" with relatively slight actuator movement.

The analog sensor 42, used to detect the relative motion of the actuating member 32 when in analog mode (or in both analog and digital mode depending on the embodiment), is preferably either a magnetic reluctance type detector similar to the sensor used in the analog pointing device described in U.S. Pat. No. 5,504,502, or a pressure sensitive resistive transducer array as described in U.S. Pat. No. 5,431,064. Suppliers of appropriate sensors include Fujitsu Limited of Kanagwa, Japan, and In Control Solutions, Inc. of Lake Oswego, Oregon, respectively.

Another potential embodiment of the x-y analog/digital actuator includes an actuator comprising a flat actuating member with digital contacts around the periphery, the contacts being contacted by the actuating member corresponding to movement of the actuating member when in digital mode. The digital contacts may be disengaged from the actuating member when in analog mode.

In yet another embodiment, the x-y analog/digital actuator could comprise only an analog sensor which would perform either analog or digital operations based on selection by the computer program or video game, an electronic mode switch, a manual mode switch, or other selection means. Digital-resistance contacts could be used to provide a digital-like tactile feedback (as discussed above). Another option is for the controller to send both an analog and a digital signal, based on movement of the actuating member, and the computer or video gaming system could then select which signal to use.

It should be apparent from these exemplary embodiments that there are numerous other ways to accomplish the same results which would be obvious to one skilled in the art based on the foregoing disclosure. Therefore, such modifications and variations fall within the spirit and scope of the invention and claims.

Button Grouping

Figure 4:
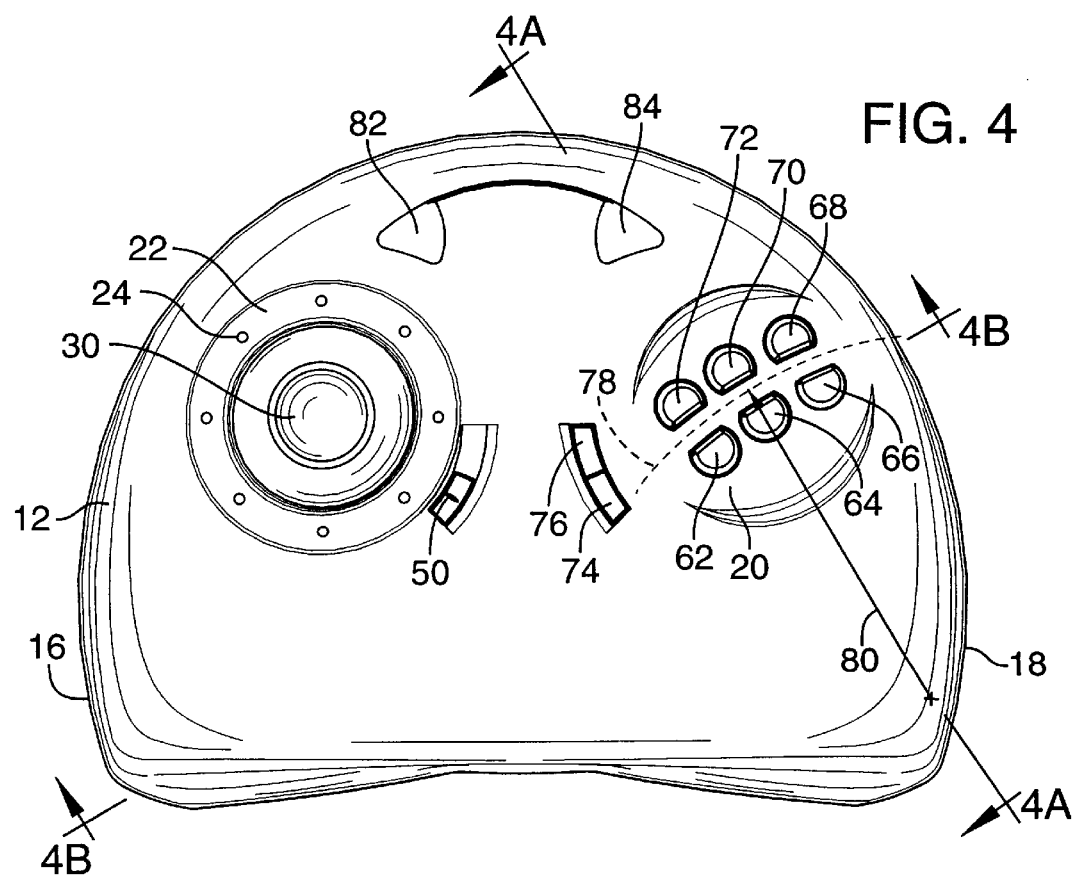
FIG. 4 is a top plan view of the controller of FIG. 1 showing the button grouping configuration.

Referring to FIG. 4, the button grouping 60 of this embodiment comprises six buttons, 62, 64, 66, 68, 70, and 72, located within the concave recess 20 of the top housing member 12. Two additional buttons 74 and 76 are located externally from the recess 20. The button grouping is located such that a thumb hand digit, when an operator's right hand is placed in the appropriate spot along the right gripping member 18 (based on hand-size), will be able to easily access every button in the grouping.

Preferably, the six buttons within the recess are located along a button grouping curvature line 78 in pairs, with the button pairs configured such that a set of lines drawn through each pair's centers form convergent rays toward the operator's right hand, when holding the controller. The curvature line 78 may be roughly analogous to a thumb pivot radius 80. Additionally, in order to make transition between buttons easier, the top of each button in the concave recess is slanted downward toward the curvature line 78. The button shape, in combination with the button orientation, therefore allows easy access to every button in the recess from another button in the recess with a simple rolling, gliding, or sliding movement of the right thumb or other hand digit. A left-handed controller could be made with the button grouping oriented on the left side of the controller instead of the right side, in a similar manner.

Figure 4A:
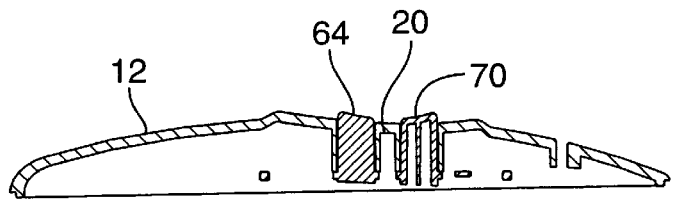
FIG. 4A is a cross-sectional view of the button grouping configuration of FIG. 4, taken along lines 4A—4A in FIG. 4.

FIG. 4A shows with more clarity the result of placing the six buttons 62, 64, 66, 68, 70, 72 (buttons 64, 76 shown) within the concave recess 20. By placing the buttons within the recess, each button can be easily accessed from another button with a simple rolling, gliding or sliding of the thumb or other hand digit. Also shown is the downward sloping of the buttons' top sides, towards the button curvature line. These features provide greatly enhanced game-play due to the ease of access of nearby buttons with simple thumb or finger motions.

Figure 4B:
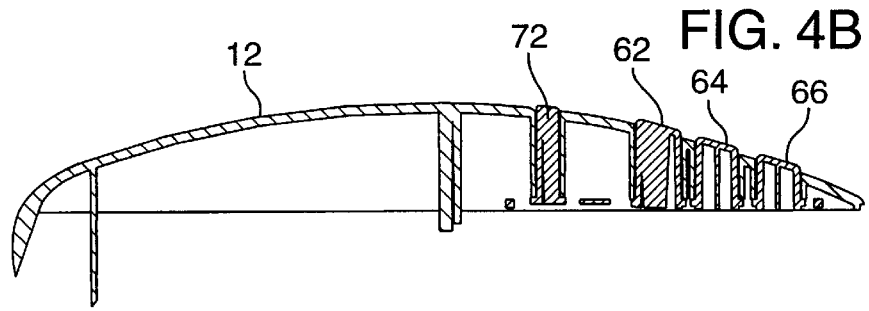
FIG. 4B is a cross-sectional view of the button grouping configuration of FIG. 4, taken along lines 4B—4B in FIG. 4.

FIG. 4B shows the button configuration relative to the top structure 12 and concave recess 20. The buttons' heights decrease corresponding to the curvature of the concave recess 20 and the top structure 12. Each button top is thereby maintained slightly above the top surface of the housing top 12 within concave recess 20. This, in combination with the sloping button tops, prevents "catching" of the hand digit on adjacent button sides, further enabling ease of button access.

Housing and Gripping Members

Figure 7:
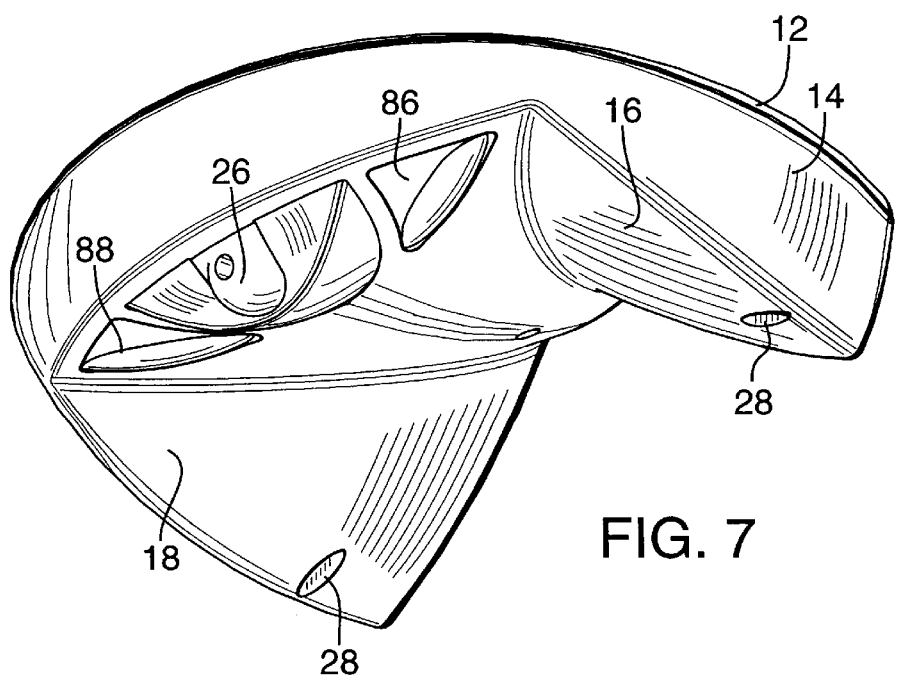
FIG. 7 is a bottom, front, left perspective view of the controller in FIG. 1 showing the gripping members and tripod-like shape of the controller structures.
Figure 8:
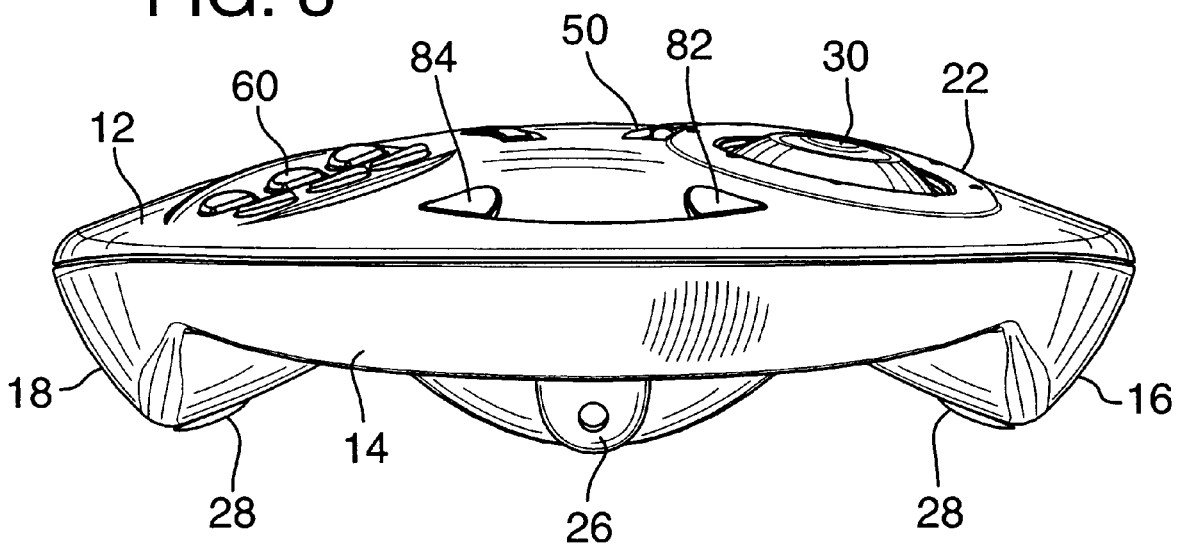
FIG. 8 is a front elevation view of the controller in FIG. 1, showing the tripod structure and a representative surface, for resting the controller on a horizontal surface during game play.

As represented in FIGS. 5, 6, and 7 the housing 10 and gripping members 16, 18 are configured such that the controller will comfortably fit virtually any user's hands, regardless of size. This is a result of the combination of the semicircular shaped housing periphery and the 3-dimensional tapered wedge shape of the gripping members 16, 18. The gripping members 16, 18 are tapered upward and outward, narrowing toward the front of the housing, such that they will fill the operator's hands comfortably when he/she positions them at the appropriate spot along the housing periphery, as determined by handsize. For example, an operator with a smaller-sized hand 90 grips the controller nearer to the front of the housing 10. The gripping members 16, 18 are correspondingly smaller toward the front of the housing 10. A larger hand 92 is positioned toward the rear of the housing 10. The gripping members 16, 18 become correspondingly larger toward the rear of the housing 10, so as to comfortably fill increasingly larger hand-sizes.

Furthermore, the button grouping 60 and the x-y directional actuator 30 are located such that when the user's hands are located at the appropriate spot along the periphery of the housing 10, based on hand size, they may easily access these actuational members. This is the result of locating the actuational members at approximately the "pinch point" position (the point where the thumb and index finger of the same hand are comfortably touched together at their tips) when the hand is appropriately positioned along the controller's side. Smaller hands have a shorter distance between the hand and "pinch point" as well as a smaller "pinch-point area" (the area between the thumb and index finger when touched at their tips). In recognition of this, the controller of this invention is uniquely designed with a decreasing distance between the controller side and actuating member and a correspondingly decreasing gripping structure area (to comfortably fill the user's "pinch-point area") toward the front of the housing. This configuration provides a comfortable and ergonomically beneficial gripping shape, with easy access to controller features for users of nearly every different hand-size, from child to adult.

Table-top and Hand-held Functionality

Additional features of this invention are shown in FIGS. 6, 7, 8 and 9. As shown, the gripping members 16, 18 in combination with the cord connection member 26 provide a tripod-like structure. This provides the controller with stability as it rests on a table-top or other surface, even if the surface is not completely flat (see FIG. 8). Additionally, feet 28 are attached to the bottom of the gripping members to prevent slippage of the controller while resting on the surface.

Furthermore, in order to provide full controller functionality from a table-top position, left-top trigger button 82 and right-top trigger button 84 (see FIG. 1) are provided on the top of the controller, in addition to left-bottom trigger 86 and right-bottom trigger 88. The top trigger buttons are preferably hard-wired to the bottom triggers to provide the same function. However, the buttons may be made programmable, thereby allowing, but not requiring, them to perform the same function. In this alternate embodiment, the trigger buttons may provide various functions, including trigger functions, based on operator or game/simulation selection.

Figure 9:
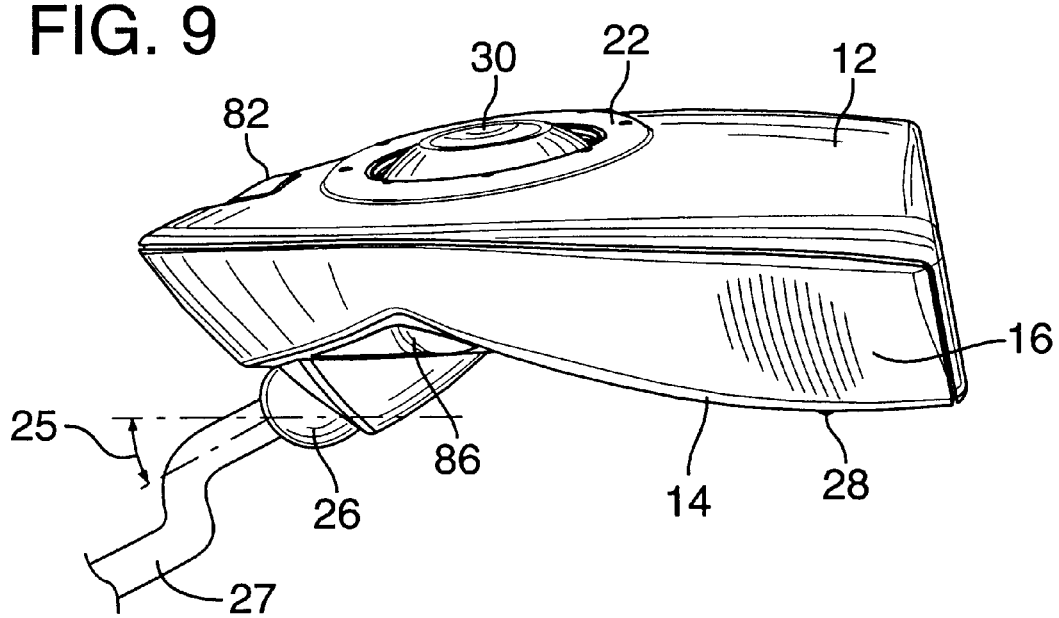
FIG. 9 is a left elevation view of the controller in FIG. 1, showing the exit angle of the cord connection member.

Referring to FIG. 9, a downward exit angle 25 for cord member 27 from the cord connection member 26, is provided. The controller is thereby enabled to be held with the front slightly elevated, if desired, to provide greater operator comfort, without the cord interfering with the operator's field of vision. Alternatively, the cord connection member can house an infra-red (IR) communications port is used instead of a cord member 27 to communicate with the PC port or bus or the video gaming system input terminal (not shown).

Having described and illustrated the principles of the invention in a preferred embodiment and other potential embodiments thereof, it should be apparent that the invention can be modified in arrangement and detail by those skilled in the art without departing from such principles. We, therefore, claim all modifications and variations coming within the spirit and scope of the following claims.

We claim:

1. A controller for a video game or simulation providing both analog and digital capabilities with a single actuating member, the controller comprising:

an housing;

an analog/digital x-y directional actuator located within the housing; and an analog/digital mode switch for selecting between an analog mode and a digital mode;

wherein the analog/digital x-y directional actuator is configured to perform either analog or digital functions depending on the selected mode; and wherein the analog/digital x-y directional actuator includes an actuating member comprising a body, a plurality of contacting members interspersed along the periphery of the body, and a plurality of disengagement slots located along the periphery of the body between the contacting members, the disengagement slots for selecting either the analog or digital modes.

2. A controller according to claim 1 wherein the analog/digital x-y directional actuator comprises:

a digital contact member positioned so as to be actuated by a movement of said actuating member when in the digital mode; and an analog sensor.

3. A controller according to claim 2 wherein the analog sensor performs either analog or digital functions, as selected.

4. A controller according to claim 3 wherein the digital contact member provides digital-like resistance but does not perform a signal creating function.

5. A controller as in claim 1, the mode switch being electrical.

6. A controller for a video game or simulation providing both analog and digital capabilities with a single actuating member, the controller comprising:

an housing;

an analog/digital mode switch for selecting between an analog mode and a digital mode; and an analog/digital x-y directional actuator located within the housing, the analog/digital x-y directional actuator being configured to perform either analog or digital functions depending on the selected mode, the analog/digital x-y directional actuator comprising:

an actuating member comprising a body, a plurality of contacting members interspersed along the periphery of the body, and a plurality of disengagement slots located along the periphery of the body between the contacting members;

a plurality of digital contact points;

the contacting members actuating the digital contact points according to a movement of the actuating member, when in digital mode;

said disengagement slots being located over the digital contact points when the mode switch is set to analog mode; and an analog sensor.

7. A controller according to claim 6 in which the analog/digital x-y directional actuator further comprises:

a central axis passing vertically through the center of the x-y directional actuator; and an actuator frame substantially preventing rotation of the actuating member about the central axis relative to the actuator frame.

8. A controller as in claim 6, movement of the mode switch causing the disengagement slots to become located over the digital contact points or causing the contacting members to become located over the digital contact points according to the direction of movement.

9. A controller according to claim 6 wherein the analog sensor performs either analog or digital functions, as selected.

10. A controller according to claim 9 wherein the digital contacting members provide digital-like resistance but do not perform a signal creating function.

11. A controller according to claim 6 wherein the mode switch is an electrical switch.

12. A dual-mode directional actuator, configured to perform either analog or digital functions or both, as selected, the dual-mode directional actuator comprising:

an analog/digital mode switch for selecting either an analog mode or a digital mode;

an actuating member comprising a body, a plurality of contacting members interspersed along the periphery of the body, and a plurality of disengagement slots located along the periphery of the body between the contacting members, the disengagement slots for selecting between the digital or analog mode;

a digital contact member in communication with said actuating member when in digital mode; and an analog sensor.

13. A dual mode directional actuator according to claim 12 comprising:

a central axis passing vertically through the center of the dual-mode directional actuator; and an actuator frame substantially preventing rotation of the actuating member relative to the actuator frame about the central axis.

14. A dual-mode directional actuator according to claim 12 wherein the analog sensor is configured to perform both analog and digital functions, as selected.

15. A dual-mode directional actuator according to claim 12 the plurality of digital contact members provide digital-like tactile feedback but do not perform a signal creating function.

16. A dual-mode directional actuator as in claim 12, in which the mode switch includes an electrical switch for selecting electrically between digital and analog functions.

17. A dual-mode directional actuator configured to perform either analog or digital functions or both, as selected, the dual-mode directional actuator comprising:

an analog/digital mode switch for selecting either an analog mode or a digital mode;

an actuating member comprising a body, a plurality of contacting members interspersed along the periphery of the body, and a plurality of disengagement slots located along the periphery of the body between the contacting members;

a plurality of digital contact points positioned to be contacted by the contacting members according to a movement of the actuating member when in digital mode, said digital contact points being located within the disengagement slots when in analog mode; and an analog sensor.

18. A dual-mode directional actuator according to claim 17 wherein:

the actuator is displaced relative to the digital contact points in accordance with a movement of said mode switch; and the displacement causes the disengagement slots to become located over the digital contact posts.

19. A dual-mode directional actuator according to claim 17 wherein the analog sensor is configured to perform both analog and digital functions, as selected.

20. A dual-mode directional actuator according to claim 17 wherein the plurality of contacting members provide digital-like tactile feedback but do not perform a signal creating function.

21. A dual-mode directional actuator according to claim 17 wherein the mode switch includes an electrical switch for electrically selecting between digital and analog functions.

22. A controller for a video game or simulation comprising:

an housing having a top, a bottom, a right sidewall, a left sidewall, a front, and a back;

said left and right sidewalls having a semicircular shape;

said housing comprising a pair of gripping members extending along the right and left sidewalls;

said gripping members being three dimensionally wedge-shaped, tapered from back to front, upward and outward;

an analog/digital x-y directional actuating member located on the top of the housing comprising a body, a plurality of contacting members interspersed along the periphery of the body, and a plurality of disengagement slots located along the periphery of the body between the contacting members, the disengagement slots for selecting either an analog mode or a digital mode;

an analog/digital mode switch;

a concave recess located on the top of the housing;

a grouping of signal actuators located within the concave recess; and a trigger button located on the top of the housing.

* * * * *